United States Patent Office 2,765,281
Patented Oct. 2, 1956

2,765,281

CALCIUM PYROPHOSPHATE PHOSPHOR

Robert E. Chrien, Cleveland, Ohio, assignor to General Electric Company, a corporation of New York No Drawing. Application June 30, 1953,
Serial No. 365,290

6 Claims. (Cl. 252—301.4)

This invention relates to luminescent materials or phosphors. The invention is concerned with the luminescent efficiency and radiant output of phosphors in gaseous electric discharge devices such as fluorescent lamps, including lamps of the ordinary positive column discharge type, and in electronic devices such as cathode ray tubes.

Phosphors consist in general of a major proportion of a base material or matrix and a minor proportion of another material called an activator. Several activators may contribute to the fluorescence of a phosphor, and the matrix may also be composite, consisting of several substances intimately interincorporated. The luminescent qualities of a phosphor generally depend on the relation between matrix and activator materials as determined by the heat treatment to which they are subjected, as well as on the materials themselves and their relative proportions. The activator material appears to be in solid solution in the matrix material; or, otherwise stated, the activator seems to be taken up into the structural lattice of the matrix, either as a network forming constituent or as a network modifying constituent, or both. The exact interrelation among the components of a phosphor or the exact role of a particular component of the phosphor may be difficult to determine, and in complex cases it may be quite difficult to determine whether a component is to be classified as matrix or as activator. Apparently it is the metallic atom or ion of the activator compound that determines its special luminescent effect, although this metallic atom or ion is probably present in the phosphor as a compound.

Calcium pyrophosphate phosphors activated by silver, thallium, bismuth, lead, tin, antimony, samarium or manganese fluoresce under cathode ray bombardment, but only the antimony activated phosphor fluoresces appreciably under excitation by short-wave ultraviolet radiation. However, calcium pyrophosphate activated by antimony ($Ca_2P_2O_7$:Sb) is quite inefficient under 2537 A. excitation and the luminous output of fluorescent lamps incorporating this phosphor is very low.

It is therefore one object of my invention to provide a pyrophosphate phosphor of improved "brightness" and efficiency by the incorporation therein of a matrix-modifying material, such as a compound of sodium for instance, to increase the short-wave ultraviolet absorption and internal conversion efficiency of these phosphors.

Another object of my invention is to provide an efficient pyrophosphate phosphor capable of producing a deep blue emission under excitation by either short-wave ultraviolet radiation or cathode rays.

Still another object of my invention is to provide an efficient pyrophosphate phosphor capable of producing an emission varying in color from violet-white through white to pink under excitation by short-wave ultraviolet radiation or from violet-white through white to yellow under excitation by cathode rays, said variations in color being dependent upon composition.

I have found that the incorporation of a small amount of a sodium compound in a calcium pyrophosphate matrix ($Ca_2P_2O_7$) markedly increases the fluorescent efficiency of either the antimony or antimony and manganese activated phosphors. This new and practical phosphor matrix will hereinafter be referred to as calcium-sodium pyrophosphate. The phosphors activated by antimony and by both antimony and manganese in combination are perhaps best represented as $(Ca,Na_2)_2P_2O_7$:Sb and $(Ca,Na_2)_2P_2O_7$:Sb·Mn, respectively. The exact role of sodium in converting calcium pyrophosphate activated by antimony or by both antimony and manganese into efficient phosphors is not completely understood. The addition of a small amount of sodium, either as the carbonate (or other oxide-producing compound) or as a halide, significantly increases the absorption of incident 2537 A. ultraviolet radiation and also increases the internal conversion efficiency. Sodium probably cannot be classed as an activator because there is no emission band traceable to it. On the basis of coordination number and ionic diameter, it is suggested that sodium ions probably replace calcium ions in the lattice. The sodium concentration may vary over a wide range without significant effect on the emission.

Briefly stated, in accordance with one aspect of my invention, efficient phosphors may be prepared by either dry or wet reaction methods. The dry method involves intimately admixing calcium acid phosphate or the pyrophosphate, a sodium compound, an oxide or oxide-producing compound of the desired activator or activators and enough ammonium phosphate to give a base-to-acid ratio slightly less than 2.0. The wet reaction method involves the addition of dilute phosphoric acid to a water slurry of, for example, calcium carbonate, sodium carbonate and the oxides or oxide-producing compounds of the activator or activators. The reacted mixture is completely dried, milled for a short period and heat treated. Prepared mixtures are heat treated by firing or calcining at about 700–1000° C. in covered refractory crucibles for from 15 minutes to several hours. The ease with which luminescent centers are formed in these phosphors is noted by the fact that some fluorescence is observable in the above reacted and dried mixtures even before the firing operation.

By the incorporation of antimony into the

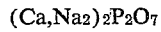

matrix, a deep blue emission results from excitation by either 2537 A. ultraviolet radiation or cathode rays. A comparison of the spectral emission curves of a standard lead-free calcium tungstate phosphor and an antimony activated calcium-sodium pyrophosphate phosphor excited by short-wave ultraviolet radiation indicates that both phosphors peak at about 4150 A., that is, attain maximum per cent relative energy at that wavelength, but the pyrophosphate phosphor peaks more sharply and the peak energy is considerably higher than for the calcium tungstate phosphor. While the pyrophosphate phosphor has a peak energy higher than the tungstate, the total energy output of the pyrophosphate is 90–95% that of the tungstate. The greater energy output of the tungstate in the region beyond about 4600 A. renders its emission blue-white in contrast to the nearly pure blue emission of the pyrophosphate. The emission characteristics of the pyrophosphate phosphor activated by antimony are practically independent of temperature up to about 250° C.

When activated by both antimony and manganese, the calcium-sodium pyrophosphate phosphor emission under 2537 A. ultraviolet excitation shifts from deep blue through violet-white and white and finally to pink depending upon the manganese content. The spectral emission curve for this antimony and manganese activated phosphor exhibits two emission peaks, the antimony band peaking sharply at about 4150 A. and the manganese band peaking at about 5750 A. Excited by cathode rays, the phosphor gives an emission which shifts from deep blue through white to yellow depending on the manganese content. The manganese band is temperature sensitive. On heating, the emission goes through a gradual change from violet-white or pink, to weak greenish-blue at about 300° C.

The incorporation of sodium into the calcium pyrophosphate matrix assures useful fluorescence, increases "brightness" and reduces the necessary firing temperature of the antimony activated and antimony and manganese activated phosphors. The sodium concentration may vary over a wide range without significant effect on the efficiency, that is, from about 0.1 to 50 atoms of sodium per 100 atoms of calcium, or about 0.025 to 9.5 per cent of the total weight of the phosphor calculated as $Na_2O$. These ranges correspond to about 0.03 to 13.0% of the total moles of CaO, $Na_2O$, $Sb_2O_3$, MnO (if any) plus $P_2O_5$. Sodium concentrations below these ranges fail to produce a significant improvement. Optimum results are attained by the incorporation of sodium into the phosphor corresponding to about 1.0 to 10 atoms of sodium per 100 atoms of calcium, or about 0.3 to 3.1 per cent of the total moles of CaO, $Na_2O$, $Sb_2O_3$, MnO (if any) plus $P_2O_5$. These optimum ranges are approximately equal to about 0.25 to 2.2 per cent by weight $Na_2O$ in the phosphor. Phosphors of equal efficiency and equal spectral emission result whether sodium is added to the phosphor batch as a halide or as an oxide-producing compound. The presence of halide or the type of halide has no effect on the spectral emission characteristics. It is the presence of sodium which produces the desired result. Since sodium has no effect on the position of the emission bands but only on their magnitude, measuring the relative heights of say the 4150 A. band for a series of antimony activated phosphors containing varying amounts of sodium is a simple method of evaluating the relative energy emitted by these phosphors. Sodium does not preferentially enhance one of the emission bands of the phosphor activated by both antimony and manganese but equally enhances each of them.

Thus, it appears that sodium replaces calcium in the matrix and promotes the development of luminescent centers during the firing process. While it contributes no luminescence of its own, it has considerable effect on the brightness, but not the color, of the luminescence attributed to antimony or to antimony and manganese. While sodium increases the absolute absorption of 2537 A. radiation, it increases the relative energy of the emission slightly more and therefore has a favorable effect on quantum efficiency. At optimum sodium concentration the absolute absorption by the phosphor of 2537 A. radiation is approximately twice that of the sodium-free phosphor and at higher concentrations there is little increased effect on the absorption. The same addition of sodium doubles the relative energy of the emission, while higher concentrations have no further effect.

The absorption of 2537 A. ultraviolet radiation by various calcium-sodium pyrophosphate phosphors was determined indirectly by measuring the reflected radiation with a cadmium photocell which is sensitive only to 2537 A. radiation. A special calcium carbonate (86% absolute absorption of 2537 A.) was used as a working standard.

Results of absorption measurements show that calcium-sodium pyrophosphate phosphors activated with antimony and containing optimum sodium absorb about 90% of the incident 2537 A. radiation. Calcium pyrophosphate phosphors activated with antimony and free of sodium were found to absorb no more than 50% of the radiation. The relative energy of the emission from this latter sodium-free phosphor was below that expected for 50% absorption, that is, it has a lower conversion efficiency than calcium-sodium pyrophosphate activated by antimony. The antimony-manganese activated phosphors absorb about 87% of the incident 2537 A. radiation and have comparable conversion efficiencies.

From these results it can be seen that the incorporation of sodium increases the quantum efficiency (ratio of quanta absorbed to quanta emitted as visible light) of the phosphor. Thus, it appears that the role of soduim in converting calcium pyrophosphate, antimony-activated, or antimony-manganese-activated, to an efficient phosphor is not only to increase the absorption of incident 2537 A. ultraviolet radiation, but also to increase the quantum efficiency.

The quantum efficiencies of a calcium-sodium pyrophosphate antimony-activated phosphors were determined by comparison with a standard magnesium tungstate phosphor of internal quantum efficiency of approximately 100%; that is, it emits one quantum of visible light for every quantum of 2537 A. ultraviolet radiation absorbed. The quantum efficiency of $(Ca,Na_2)_2P_2O_7$:Sb containing optimum sodium and antimony is about 80%.

The antimony activator of the calcium-sodium pyrophosphate phosphors may be added as antimony trioxide $(Sb_2O_3)$. The amount may vary over a wide range, from about 0.065 to 2.75 percent of the total moles of CaO, $Na_2O$, MnO, $Sb_2O_3$ plus $P_2O_5$ or from about 0.20 to 8.6 percent by weight of the phosphor. These ranges correspond to concentrations of about 0.2 to 9.0 atoms of antimony per 100 atoms of calcium plus sodium plus manganese (if any). Antimony probably replaces calcium in the matrix and is directly responsible for the deep blue luminescence. The concentration of antimony determines only the efficiency of the luminescence, not the color. There is no shift of the emission band with change in activator concentration, as in certain other phosphors. There is some antimony lost during the firing process (about 10–20% depending on how well the crucible is covered). Analysis shows that, as in the well-known halophosphate phosphors, some insoluble antimony compound, as yet unidentified, is formed during firing. This antimony is lost as far as its activating properties are concerned and in fact, if present in excessive amounts, may poison the phosphor. Maximum relative energy (optimum emission) of the 4150 A. band occurs when the antimony trioxide molar concentration in the fired phosphor falls between about 0.13 and 2.05 percent of the total moles of CaO, $Na_2O$, MnO (if any), $Sb_2O_3$ plus $P_2O_5$. This optimum range of antimony trioxide corresponds to a range of from 0.4 to 6.5 atoms of antimony per 100 atoms of calcium plus sodium or from 0.45 to 6.5 percent by weight $Sb_2O_3$ in the final phosphor. With increasing $Sb_2O_3$ concentrations above this optimum amount, a slight and fairly constant decrease in relative energy takes place.

Manganese may be incorporated into $(Ca,Na_2)_2P_2O_7$:Sb phosphors as an activator in the form of manganese carbonate $(MnCO_3)$ for example. The addition of manganese shifts the color of the emission under 2537 A. radiation from blue through violet-white and white to pink depending on the amount incorporated. The manganese may vary from zero to 42 atoms per 100 atoms of calcium plus sodium or zero to about 15% by weight calculated as manganese oxide (MnO) in the fired phosphor. Within these ranges the moles of MnO correspond to about zero to 19% of the total moles of CaO, $Na_2O$, MnO, $Sb_2O_3$ plus $P_2O_5$. In $(Ca,Na_2)_2P_2O_7$:Sb·Mn, at constant antimony, an increase in manganese content increases the relative energy of the manganese band at the expense of the antimony band. Beginning with a $(Ca,Na)_2P_2O_7$:Sb phosphor, and replacing calcium with increasing amounts of manganese, it is found that the efficiency of the antimony band rapidly decreases until about 7.5% by weight manganese oxide has been incorporated. At this point the antimony band has dropped to 15% of its original value and beyond 7.5% manganese oxide little change in the antimony band occurs. Meanwhile, with increasing manganese a yellow band at 5750 A. appears, reaching maximum energy efficiency in the range of about 2.2 to 5.3 percent by weight manganese oxide. Measurement of the total light output and spectral distribution for this series of phosphors indicates that the most efficient formulation from the standpoint of light output contains about 2.0 to 2.5 percent by weight manganese oxide (MnO) which in this amount produces a violet-white emission color. Between about 5.0 and 5.5 percent MnO, the phosphor gives an orange-pink emission of about 80–90% of the luminous efficiency realized with about 2.0 to 2.5 percent MnO. Thus, an optimum range of manganese in the doubly-activated calcium pyrophosphate phosphors, including desirable color possibilities at or near maximum luminous efficiency, will be from about 2 to 7.6 percent by weight calculated as manganese oxide in the final phosphor.

Variations in the antimony concentration give little variation in the spectral distribution or luminous efficiency of phosphors activated in addition by manganese. For example, with about 0.35% by weight $Sb_2O_3$, the phosphor activated in addition with manganese equal to 2.2% by weight MnO has a relative total brightness of about 83% and at 7.8% by weight $Sb_2O_3$ about 87% of the brightness realized with optimum $Sb_2O_3$ concentrations (about 1.2% by weight $Sb_2O_3$) in the doubly-activated $(Ca,Na_2)_2P_2O_7$:Sb·Mn phosphor.

In general, the relative concentrations of matrix ingredients and activator or activators in calcium-sodium pyrophosphate phosphors are not critical and may vary over a fairly wide range, except for manganese which directly affects the color of the emission. However, there is one critical variable which appears to have a significant effect on the efficiency of the phosphor and that is the so-called base-to-acid ratio. This ratio may be defined, for example, for the antimony activated phosphor, using equivalent oxygen, as $$\frac{CaO, Na_2O, Sb\frac{2}{3}O}{P_2O_5}$$

where the number of moles of $$Sb\frac{2}{3}O$$

equals three times the number of moles of $Sb_2O_3$. When the base-to-acid ratio is varied, the relative energy of emission of the 4150 A. band increases sharply with increasing ratio above about 1.6 until the base-to-acid ratio approaches 2.1, near which point the relative energy of emission begins an extremely sharp drop falling to about zero at a ratio of about 2.2. The maximum relative energy occurs at a point between the ratios of 1.9 and 2.0. Thus, it is important that the base-to-acid ratio of the phosphor be maintained at a value slightly less than 2 at all times. The same requirements hold for $(Ca,Na_2)_2P_2O_7$:Sb·Mn phosphors.

By way of specific example, I give preferred formulae and directions suitable for preparing the singly and doubly activated phosphors embodying one aspect of my invention by both the dry and wet reaction methods.

*Example I: Dry method.*—$(Ca,Na_2)_2P_2O_7$:Sb

The following materials are intimately ball-milled together in a quart mill for 5–60 minutes:

| | Grams |
|---|---|
| Calcium acid phosphate, $CaHPO_4 \cdot \frac{1}{2}H_2O$ | 145.0 |
| Diammonium hydrogen phosphate, $(NH_4)_2HPO_4$ | 7.9 |
| Sodium carbonate, $Na_2CO_3$ | 1.3 |
| Antimony trioxide, $Sb_2O_3$ | 2.1 |

The homogeneous mixture is then passed through a fine screen (30 to 100 mesh), loosely packed in a covered fused quartz or "Vycor" crucible, and fired at 825° C. for 45 minutes in an electric furnace.

*Example II: Wet method.*—$(Ca,Na_2)_2P_2O_7$:Sb

A thin suspension of the following in distilled or demineralized water is prepared:

| | Grams |
|---|---|
| Calcium carbonate, $CaCO_3$ | 100.0 |
| Sodium carbonate, $Na_2CO_3$ | 1.3 |
| Antimony trioxide, $Sb_2O_3$ | 2.1 |

A solution consisting of 72 milliliters of 85% orthophosphoric acid and approximately twice that volume of distilled or demineralized water is added slowly with constant stirring. When the evolution of carbon dioxide ceases, the entire mass is completely dried above 100° C. The resulting powder is ball-milled, sieved, and fired as in Example I.

*Example III: Dry method.*—$(Ca,Na_2)_2P_2O_7$:Sb·Mn

The following materials are intimately ball-milled as in Example I:

| | Grams |
|---|---|
| Calcium acid phosphate, $CaHPO_4 \cdot \frac{1}{2}H_2O$ | 145.0 |
| Diammonium hydrogen phosphate, $(NH_4)_2HPO_4$ | 13.2 |
| Sodium carbonate, $Na_2CO_3$ | 1.3 |
| Antimony trioxide, $Sb_2O_3$ | 2.1 |
| Manganese carbonate, $MnCO_3$ | 4.75 |

The homogeneous mixture is then passed through a fine screen (30 to 100 mesh), loosely packed in a covered fused quartz or "Vycor" crucible, and fired at 825° C. for 45 minutes in an electric furnace.

*Example IV: Wet method.*—$(Ca,Na_2)_2P_2O_7$:Sb·Mn

A thin suspension of the following in distilled or demineralized water is prepared:

| | Grams |
|---|---|
| Calcium carbonate, $CaCO_3$ | 100.0 |
| Sodium carbonate, $Na_2CO_3$ | 1.3 |
| Antimony trioxide, $Sb_2O_3$ | 2.1 |
| Manganese carbonate, $MnCO_3$ | 4.75 |

A solution consisting of 75 milliliters of 85% orthophosphoric acid and about twice that volume of distilled or demineralized water is added slowly with constant stirring. When the evolution of carbon dioxide ceases, the entire mass is completely dried above 100° C. The resulting powder is ball-milled, sieved and fired as in Example III.

These four formulations give efficient phosphors. It should be remembered that the emission color of calcium-sodium pyrophosphate activated by both antimony and manganese under excitation by 2537 A. radiation depends on the manganese content. Examples II and IV would give a rather pink emission which could be shifted to violet-white by decreasing the manganese carbonate content in the formulae, say from 4.75 to 2.0 grams and simultaneously decreasing the ortho phosphoric acid from 75 to 74 milliliters (in Example IV).

In the calcium acid phosphate used in Examples I and III, the water of crystallization may vary between 0.5 and 1.0 moles of water per mole of phosphate. The exact composition is not critical. This calcium acid phosphate may be totally replaced by 127.1 grams of calcium pyrophosphate with no effect on the final phosphor.

Since sodium may be added as either the bicarbonate or carbonate, or as a halide, the sodium carbonate in the formulae may be replaced by 2.1 grams of sodium bicarbonate, 1.46 grams of sodium chloride or 1.05 grams of sodium fluoride for example. These substitutions have no detrimental effect on the final phosphor.

Although the amounts mentioned in the above examples give good phosphors, they are not critical and a few per cent deviation will not harm the phosphor. The materials used are those currently employed in the production of commercial phosphors and extreme purity is not necessary. The effect of common impurities such as copper and lead is slight especially in the antimony activated phosphor and in small amounts these impurities do not harm the phosphor.

Maximum efficiency is obtained with the calcium-sodium pyrophosphate phosphor activated by antimony when sodium is incorporated with the phosphor in amounts which equal from about 1 to 10 atoms per 100 atoms of calcium, and when the antimony equals from about 0.4 to 6.5 atoms per 100 atoms of calcium plus sodium, and the base-to-acid ratio is about 1.9 to 2.0. The concentrations of sodium and of antimony in the phosphor are not critical but a slight excess of either is more desirable than an equally slight deficit.

In the doubly-activated phosphor $$((Ca,Na_2)_2P_2O_7:Sb \cdot Mn)$$

maximum luminous efficiency is obtained when the manganese equals from about 3.7 to 5.1 atoms per 100 atoms of calcium plus sodium and the sodium and antimony concentrations and also the base-to-acid ratio is the same as that of the singly-activated phosphor.

In the wet reaction method preparation of the pyrophosphate phosphors, it is desirable to slowly add the phosphoric acid solution to the slurry of other ingredients. Rapid addition of the acid tends to produce hard lumps in the dried powder whereas the slow addition gives a soft powder which remains soft after firing.

Modifications of the phosphors of my invention were prepared by substitution of ingredients in the matrices. For example, potassium carbonate, lithium carbonate, boron trioxide, magnesium fluoride and many other compounds were substituted for sodium carbonate in the formula for the calcium-sodium pyrophosphate matrix. None of these compounds produced the significant and desirable improvements afforded by sodium.

Phosphors were prepared in which a portion of the calcium of the calcium-sodium pyrophosphate matrix was replaced by another element of Group II of the periodic table (excluding beryllium and those of atomic weight greater than 200). It was found that the substitution of cadmium for calcium in the antimony activated pyrophosphate phosphor significantly improves its stability under cathode ray bombardment. Under short-wave ultraviolet radiation, a new emission band at about 4600 A. appears with increasing cadmium-to-calcium ratio. This 4600 A. band first becomes evident at a ratio of 20 atoms of cadmium to 80 atoms of calcium. Below this ratio the effect appears as a broadening of the 4150 A. band. Maximum luminosity of this phosphor, best represented as $(Ca,Cd,Na_2)_2P_2O_7:Sb$, is obtained with a ratio of 35 atoms of Cd to 65 atoms of Ca, which ratio produces a phosphor with a light blue emission color about 2.2 times as bright as $(Ca,Na_2)_2P_2O_7:Sb$. Variation in the antimony concentration, holding sodium concentration and base-to-acid ratio constant at optimum values for the phosphor containing no cadmium, produces little change in relative energy of the emission. Sodium is required for maximum fluorescence in these phosphors just as in $(Ca,Na_2)_2P_2O_7:Sb$ phosphor and the sodium should be in substantially equal concentrations in both. Optimum antimony concentration for this phosphor (with cadmium added) is from 0.4 to about 6.5 atoms of antimony per 100 atoms of calcium plus cadmium plus sodium, but the amount is not critical since at one-half the optimum value of antimony the relative emission energy is about 88% of maximum and at twice the optimum antimony the relative energy of the phosphor is about 90% of maximum.

The substitution of magnesium, zinc, strontium or barium for a portion of the calcium in the calcium-sodium pyrophosphate phosphor activated by both antimony and manganese produces fluorescence but is believed to be detrimental to fluorescent efficiency under excitation by short-wave ultraviolet radiation. The substitution of cadmium for calcium in the doubly-activated phosphor results in an emission under short-wave ultraviolet excitation which is somewhat more red but less efficient in relative energy than the phosphor with no cadmium. Under cathode ray excitation, barium, strontium and zinc suppressed the fluorescence, magnesium shifted it to red, and cadmium to orange.

However, the effect of these substitutions on the singly-activated phosphor $((Ca,Na_2)_2P_2O_7:Sb)$ appears to be quite different. It was found that cadmium was not the only substitute for calcium in this phosphor which would produce brighter fluorescence under 2537 A. excitation. Both barium and strontium substitutions produce a phosphor of higher luminous efficiency than does an equal substitution of cadmium. At about 50 mole per cent strontium substituted for calcium a new band at about 4900 A. appears. The same substitution of barium produces a band at about 5100 A. Zinc and magnesium were somewhat poorer than cadmium but nevertheless produce a phosphor which compares favorably with the straight calcium-sodium pyrophosphate.

Substitution of any of the metals mentioned above or mixtures thereof for calcium in the phosphor matrix can be carried out within the ratio of M (referring to the substituent metal) to calcium in the range from 0 to about 1.5 and the ratio of sodium to calcium plus M being about 0.001 to 0.50.

The use of the calcium-sodium (or other) pyrophosphate phosphors of my invention for commercial applications would offer some distinct advantages over presently used materials. All ingredients are relatively inexpensive, readily available and non-critical and these phosphors are readily prepared at substantially lower temperatures than, for example, the well-known halophosphate phosphor. There are no corrosive gases evolved and little antimony losses on firing of the calcium-sodium pyrophosphate phosphors.

Although a preferred embodiment of my invention has been disclosed, it is recognized that variations and changes may be made therein within the spirit and scope of the invention as defined by the appended claims. It is understood particularly that the ingredients, their proportions as given above and also the times and temperatures can be varied, independently and in relation to each other, within fairly wide limits to obtain the desired results.

What I claim as new and desire to secure by Letters Patent of the United States is:

1. A phosphor corresponding to the formula $$(Ca,M,Na_2)_2P_2O_7$$

wherein M is a metal selected from the group consisting of cadmium, strontium, barium, magnesium, zinc and mixtures thereof, wherein the ratio of M to calcium is in the range from zero to about 1.5, and the ratio of sodium to calcium plus M is about 0.001 to 0.50, and an activator consisting of approximately 0–42 atoms of manganese per 100 atoms of calcium plus M plus sodium and approximately 0.2 to 9.0 atoms of antimony per 100 atoms of calcium plus M plus sodium plus manganese, the ratio of bases to acid being approximately 1.6 to 2.1.

2. A phosphor corresponding to the formula $$(Ca,M,Na_2)_2P_2O_7$$

wherein M is a metal selected from the group consisting of cadmium, strontium, barium, magnesium, zinc and mixtures thereof, wherein the ratio of M to calcium is in the range from zero to about 1.5, and the ratio of sodium to calcium plus M is about 0.01 to 0.10, and activator consisting of approximately 0–19 atoms of manganese per 100 atoms of calcium plus M plus sodium and approximately 0.4 to 6.5 atoms of antimony per 100 atoms of calcium plus M plus sodium plus manganese, the base-to-acid ratio being approximately 1.9 to 2.0.

3. A phosphor corresponding to the formula $$(Ca,Na_2)_2P_2O_7$$

wherein the ratio of sodium to calcium is about 0.001 to 0.50, and an activator consisting of approximately 0.2 to 9.0 atoms of antimony per 100 atoms of calcium plus sodium, and wherein the ratio of bases to acid is approximately 1.6 to 2.1.

4. A phosphor corresponding to the formula $$(Ca,Na_2)_2P_2O_7$$

wherein the ratio of sodium to calcium is about 0.01 to 0.10, and an activator consisting of approximately 0.4 to 6.5 atoms of antimony per 100 atoms of calcium plus sodium, and wherein the ratio of bases to acid is approximately 1.9 to 2.0.

5. The method of preparing a luminescent material which is formed without fusion at a temperature of about 1000° C. which comprises mixing constituents which will react to form a pyrophosphate corresponding to the formula $(Ca,M)_2P_2O_7$ wherein M is a metal selected from the group consisting of cadmium, strontium, barium, magnesium, zinc and mixtures thereof, wherein the ratio of M to calcium is in the range from zero to about 1.5, adding to the mixture a sodium compound of the group consisting of the carbonates and halides and in an amount to supply a ratio of sodium to calcium plus M of about 0.001 to 0.50, and activator compounds to supply approximately zero to 42 atoms of manganese per 100 atoms of calcium plus M plus sodium and approximately 0.2 to 9.0 atoms of antimony per 100 atoms of calcium plus M plus sodium plus manganese, the ratio of bases to acids being maintained at about 1.6 to 2.1, and heating to a temperature of about 700 to 1000° C. for a time sufficient to form a luminescent product.

6. The method of preparing a luminescent material which is formed without fusion at a temperature of about 1000° C. which comprises mixing constituents which will react to form a pyrophosphate corresponding to the formula $(Ca,M)_2P_2O_7$ wherein M is a metal selected from the group consisting of cadmium, strontium, barium, magnesium, zinc and mixtures thereof, wherein the ratio of M to calcium is in the range of from zero to about 1.5, adding to the mixture a sodium compound of the group consisting of the carbonates and halides and in an amount to supply a ratio of sodium to calcium plus M of about 0.001 to 0.50, and activator compounds to supply approximately zero to 42 atoms of manganese per 100 atoms of calcium plus M plus sodium and approximately 0.2 to 9.0 atoms of antimony per 100 atoms of calcium plus M plus sodium plus manganese, the ratio of bases to acids being maintained at about 1.9 to 2.0, and heating to a temperature of about 800 to 850° C. for a time sufficient to form a luminescent product.

References Cited in the file of this patent

UNITED STATES PATENTS

| 2,241,951 | Huniger | May 13, 1941 |
| 2,575,754 | Froelich | Nov. 20, 1951 |
| 2,575,755 | Froelich | Nov. 20, 1951 |

FOREIGN PATENTS

| 578,272 | Great Britain | June 21, 1946 |

OTHER REFERENCES

Journal of Electrochem. Soc., vol. 98, No. 10, Oct. 1951. Article by Froelich and Margolis, pp. 400–405.